United States Patent [19]

Kezran

[11] 4,200,416
[45] Apr. 29, 1980

[54] TOOL WITH INTERCHANGEABLE INSERT
[75] Inventor: Mitchell Kezran, Cranston, R.I.
[73] Assignee: Precision Industries, Inc., Providence, R.I.
[21] Appl. No.: 893,319
[22] Filed: Apr. 3, 1978
[51] Int. Cl.² .......................................... B26D 1/00
[52] U.S. Cl. ..................................................... 407/108
[58] Field of Search ................ 407/105, 104, 103, 108
[56] References Cited
U.S. PATENT DOCUMENTS

| | | | |
|---|---|---|---|
| 3,339,256 | 9/1967 | Melinder | 407/108 |
| 3,545,060 | 12/1970 | Kezran | 407/108 |

Primary Examiner—Leonidas Vlachos
Attorney, Agent, or Firm—Salter & Michaelson

[57] ABSTRACT

A tool having an interchangeable insert includes a body with a recess for receiving the insert. The body is further provided with alignment means whereby the insert and body may be operatively positioned with respect to a work piece. A wedge positioned between the insert and the body forces the insert into operational contact with the alignment means. A step abuts a portion of the edge so as to force the wedge against the insert in substantial line contact therewith so as to prevent opposite surfaces of the body and insert from fully contacting the wedge in a manner which could result in frictional blocking, i.e. taper lock, and accordingly subsequent improper hang up of the wedge.

1 Claim, 4 Drawing Figures

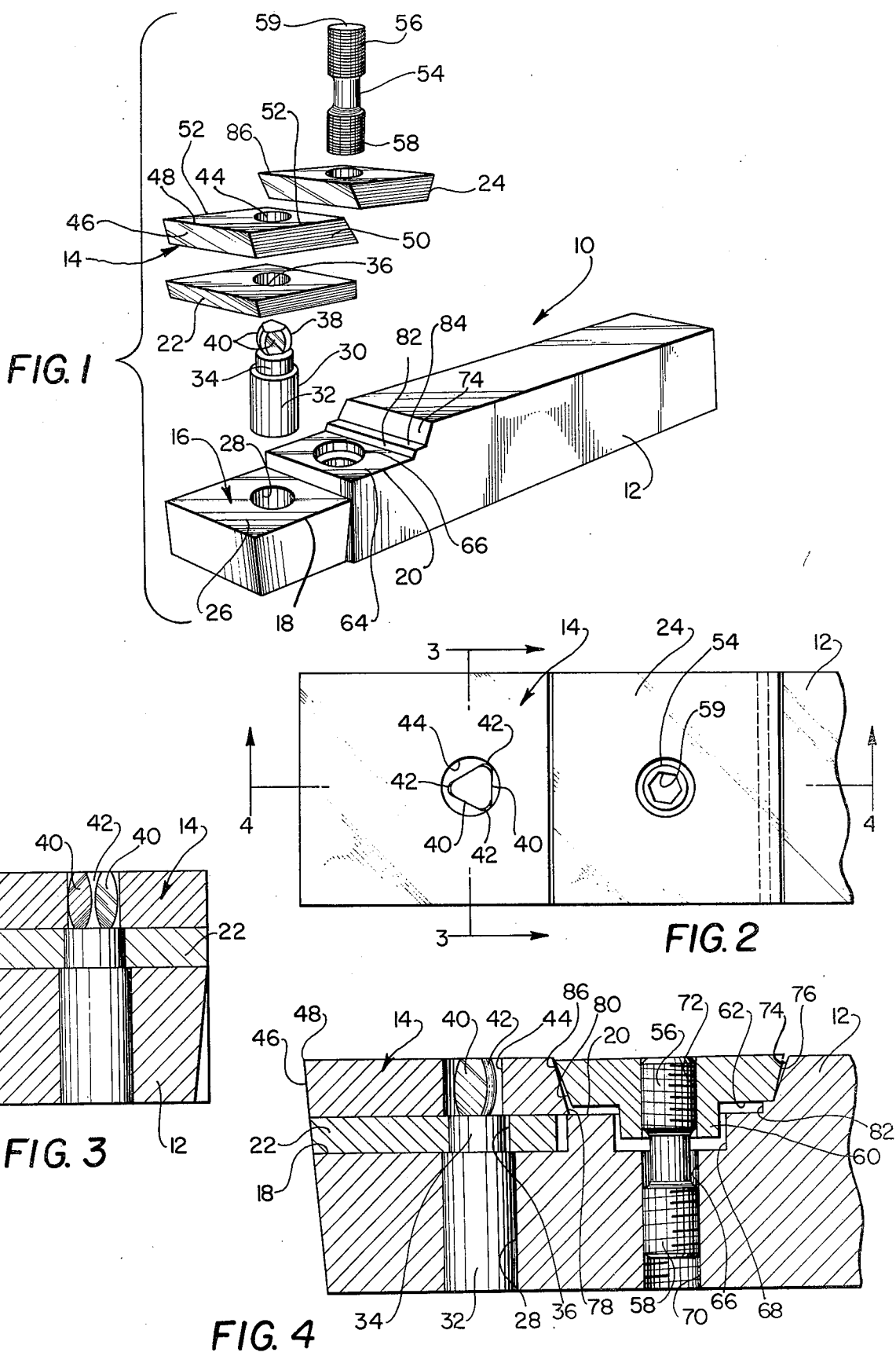

TOOL WITH INTERCHANGEABLE INSERT

BACKGROUND AND SUMMARY OF THE INVENTION

This invention relates to a tool and particularly one in which an interchangeable insert is held in operative position by a holder assembly. Devices of this general nature are known and one construction thereof which has met with particular success is described in applicant's previous patent U.S. Pat. No. 3,545,060 issued Dec. 8, 1970.

The device disclosed in that patent includes a body 12 provided with a recess 18 at the forward end thereof on which an insert 44 having at least one cutting surface 46 is positioned thereon with regard to an alignment means 74. A wedge 56 is disposed between the insert and an inclined wedging surface 24 of the body 12. It may thus be seen that the front and rear wedging surfaces of the wedge are adapted to respectively contact the rear surface 52 of the insert and the inclined wedging surface 24 of the body respectively in face-to-face contact. Such contact on occasion can, however, result in frictional blocking or taper lock between the respective sliding surfaces such that the wedge may become hung up or locked by such frictional contact and will not travel its full distance to insure proper positioning of the insert. Such taper locking can occur when two generally highly polished surfaces are placed in intimate sliding contact with each other. The citation and discussion of applicant's above-identified patent constitutes applicant's Prior Art Statement; and in that regard, a copy of such patent is included with this application.

It is accordingly a primary object of the present invention to provide a tool of the above-indicated type wherein such undesirable taper locking is prevented.

A further object of the present invention is the provision of a tool of the immediately aforementioned type in which interchangeable inserts may be properly positioned with regard to a tool body by means of a wedge acting upon a back locating surface of the insert in substantial line contact therewith.

These and other objects of the present invention are accomplished by a provision of an upwardly extending step at adjacent rear portions of the inclined wedging surface which delineates the rear wall of the recess. The position of the step is such that rear bottom wall surfaces of the wedge are adapted to abut or rest upon it. Thereafter, upon further downward travel of the wedge in the opening between the insert and the body, forward portions of the wedge are downwardly tilted into substantially line contact with the back locating surface of the insert. This prevents extensive sliding contact between the opposed and generally highly polished surfaces of the insert and wedge and thus avoids any possible taper lock between them.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is an exploded perspective view showing the components of the improved tool of the present invention;

FIG. 2 is a partial top plan view thereof;

FIG. 3 is a sectional view taken along the line 3—3 of FIG. 2; and

FIG. 4 is a sectional view taken along the line 4—4 of FIG. 2 and showing in particular the manner in which the wedge contacts the back locating surface of the insert.

DESCRIPTION OF THE INVENTION

The tool 10 of the present invention includes a body 12 adapted to be held in a tool holder (not shown) so as to position a cutting insert 14 with regard to the work piece (also not shown). For this purpose the forward end of the body is provided with a stepped recess 16 having a first portion 18 and a second portion 20. The forward section 18 of the recess 16 is of a greater depth than the second portion 20 so as to provide for the receipt of a shim 22 of varying thicknesses depending upon the thickness of the replaceable insert 14 to be utilized. In this manner then the insert 14 may be positioned at a height with regard to the recess 16 so that a wedge 24 may be positioned between said insert and remaining portions of the body 12 at a mutually operative height. The manner in which the wedge 24 functions will be hereinafter explained.

The top surface 26 of the first recess portion 18 is provided with a downwardly extending generally circular bore 28 in turn adapted to receive a pin 30. The pin includes a base portion 32 adapted to be driven into the bore 28 so as to be held thereby. The pin further includes an intermediate portion 34 of reduced diameter in turn adapted to be received by a bore 36 provided in the shim 22. The upper end of the pin 30 terminates in a member 38 of generally triangular cross-sectional configuration and including three flat faces 40 which cooperatively form three vertically rounded surfaces 42 each isolated from each other by a flat surface 40.

Such member 38 is adapted to project into a bore 44 provided in the insert 14 such that the two rear isolated surfaces 42 contact inner surfaces of the bore 44 and the forward isolated surface 42 is slightly spaced therefrom. In this manner then, the cooperation between the aforementioned pin 38 and the various bores forms an alignment means by which the insert can be positioned with respect to the tool body 12 such that one or more cutting surfaces thereof are disposed in operative position to a work piece.

The forward surface 46 of the insert and its adjacent edge 48 may form such a cutting surface or edge. Similarly, the side surfaces 50 of the insert and their adjacent edges 52 may provide additional cutting surfaces and edges. Accordingly, the tool 10 is provided with at least one cutting surface or edge adapted to be positioned with respect thereto by the alignment means.

In order to force the insert 14 up against the alignment means, that is, the bore 44 thereof into contact with the rear isolated surfaces 42 of the pin, the wedge 24 coacts with a double-ended screw 54 oppositely threaded at its ends 56, 58 and provided with a recessed drive socket 59 for receipt of an Allen head wrench. The wedge further includes a generally centrally disposed boss 60 downwardly extending from the bottom surface 62 thereof. The upper surface 64 of the second recess portion 20 is provided with a counter bored opening 66 having an upper bore 68 of such a dimension to freely accept the boss 60 therein. The bore 68 further connects with a threaded bore 70 which in turn accepts the threaded end 58 of the screw 54. The other end 56 of the screw 54 is adapted for receipt into a threaded bore 72 provided through the wedge 24. As previously brought out, the screw 54 is oppositely threaded, that is, its lower end 58 may be provided with right hand threads while the upper section 56 may be provided with left hand threads or vice versa. The bores 70, 72 in which such threaded screw ends are adapted to engage are similarly threaded.

Furthermore, the second recess portion 20 terminates in an upwardly outwardly inclined rear wall 74. The rear wall 76 of the wedge 24 is provided with a surface similar in configuration to that of the wall 74 so such may cooperate in wedging contact with each other. The rear wall or surface 78 of the insert 14 is also provided with a slanted configuration, and accordingly forms a back locating surface for the insert. Such back locating surface 78 is adapted to be contacted by the forward edge surface 80 of the wedge 24.

In order that the mutual contact between the surfaces 74, 76 and surfaces 78, 80 will not permit frictional blocking or hang up of the wedge 24 between the body 12 and the insert 14, the rear surface of the second recess portion 20 is provided with an upwardly orientated transversely extending step 82. The top surface 84 of such step is generally flat and is adapted to contact lower rear portions of the bottom 62 of the wedge 24 prior to that time which the screw 54 exerts considerable pressure upon the insert 14 via the front surface 80 of the wedge 24. This contact or grounding of the wedge 24 on the step 82 causes further downward movement of the wedge within the slot formed between the insert 14 and the wall 74 of the body 12 to be of a somewhat pivotal nature about such step 82. This results in a downward forward pivotal motion to be imparted to the insert 24. Such motion in turn causes the leading edge 86 of the forward wedge surface 80 to contact the back locating surface 78 of the insert in substantial transverse orientated line contact therewith, thus preventing full engagement between the surfaces 78, 80 and thus preventing any possible hang up therebetween as could be caused by frictional blocking.

Also when the wedge 24 is fully clamped down by the action of the screw 54, the bottom 62 of the wedge is spaced from the second portion 20 of the recess 16 in order to insure that premature bottoming thereof will not occur. Also by reason of the slack between the boss 60 and the upper portion 68 of the counter bore 66, the boss is free to rotationally move slightly back and forth, thus permitting a possible rocking movement of the wedge with respect to the body 12 and transmitted by the rotational forces imparted by the screw 54.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A forming tool having an interchangeable insert comprising, a body including a recess at one end thereof, said recess having a first portion, said insert having a cutting surface at a forward edge thereof, a bottom seating surface and a back locating surface, said insert adapted for support on said recess first portion with said bottom surface thereof seated thereon, means for aligning said insert with respect to said body including a pin and a cooperating bore formation on said body and said insert, said recess having a second portion adjacent said first portion at the rear side of said first portion, said second portion terminating in an inclined wedging surface at the opposite rear side thereof, a wedge having opposed rear and forward surfaces in predetermined relation to each other and adapted to simultaneously seat against said second portion wedging surface and the back locating surface of said insert respectively, said rear wedge surface and said second portion wedging surface and said forward wedge surface and said insert back locating surface respectively tapered at essentially the same angles, said second recess portion having an upwardly directed step transversely extending across the width of said second portion at the rear side thereof and positioned adjacent said inclined wedging surface, said wedge having a bottom surface adapted to contact the upper surface of said step, and means connecting said wedge with said holder body and adapted to move said wedge toward seating engagement in said recess wherein said forward surface of said wedge is downwardly tilted about said step whereby said wedge forward surface contacts said insert back locating surface in non-friction locking, substantially line contact therewith, the bottom surface of said wedge being spaced from said second recess portion except at rear portions thereof which contact said step, said second recess portion having a counter-bored opening therein, the bottom section of said opening threaded to receive one end of a double-ended screw, the other end of said screw adapted for receipt in a threaded opening in said wedge, the bottom surface of said wedge having a downwardly extending boss adapted for receipt in the upper section of said second recess portion opening, said screw ends being of opposite threading wherein movement thereof into said recess forces said wedge into initial contact with said step and then forwardly downwardly about said step wherein said front wedge surface contacts said back locating surface in said aforementioned substantial line contact and wherein the upper end of said counter bored opening is of a dimensional extent large enough to permit said boss to rotate back and forth therein.

* * * * *